(12) United States Patent
Stull et al.

(10) Patent No.: US 11,184,447 B2
(45) Date of Patent: Nov. 23, 2021

(54) SYSTEMS AND METHODS FOR EFFICIENT TRANSMISSION OF CATALOG DATA

(71) Applicant: Swiftly Systems, Inc., Millbrae, CA (US)

(72) Inventors: Benjamin Travis Stull, Seattle, WA (US); Daniel Kim, San Francisco, CA (US); Shawn Murphy, Seattle, WA (US); Karen Ho, San Francisco, CA (US); Sean Edward Turner, Monte Sereno, CA (US)

(73) Assignee: Swiftly Systems, Inc., Millbrae, CA (US)

( * ) Notice: Subject to any disclaimer, the term of this patent is extended or adjusted under 35 U.S.C. 154(b) by 50 days.

(21) Appl. No.: 16/412,318

(22) Filed: May 14, 2019

(65) Prior Publication Data

US 2020/0366745 A1 Nov. 19, 2020

(51) Int. Cl.
*H04L 29/08* (2006.01)
*G06F 16/23* (2019.01)
(Continued)

(52) U.S. Cl.
CPC .......... *H04L 67/18* (2013.01); *G06F 16/2379* (2019.01); *G06Q 30/0281* (2013.01);
(Continued)

(58) Field of Classification Search
CPC . H04L 67/18; H04L 67/1095; H04L 67/1097; H04L 67/20; H04L 67/42; G06F 16/2379; G06Q 30/0281
(Continued)

(56) References Cited

U.S. PATENT DOCUMENTS 7,463,909 B1 * 12/2008 Toebes ................ H04M 1/2746
455/564
7,543,118 B1 * 6/2009 Chen ......................... G06F 8/65
711/154
(Continued)

FOREIGN PATENT DOCUMENTS

WO WO 0161945 A1 8/2001

OTHER PUBLICATIONS

International Search Report and Written Opinion for International Application No. PCT/US2020/032508, dated Sep. 11, 2020.

*Primary Examiner* — David P Zarka
(74) *Attorney, Agent, or Firm* — Baker Botts L.L.P.

(57) ABSTRACT

In one embodiment, a method includes identifying a pre-determined number of items associated with one or more entities; transmitting item information associated with the pre-determined number of items to a client device; and determining that the client device is likely to enter a first entity of the one or more entities. The first entity is identified based on a physical proximity between the client device and the first entity. The method also includes accessing, based on the first entity, location-specific item information associated with one or more of the pre-determined number of items or one or more additional items; and transmitting the location-specific item information to the client device. The item information and the location-specific item information are configured to be used by the client device while the client device is within the first entity.

20 Claims, 6 Drawing Sheets

(51) Int. Cl.
*G06Q 30/02* (2012.01)
*H04L 29/06* (2006.01)

(52) U.S. Cl.
CPC ...... *H04L 67/1095* (2013.01); *H04L 67/1097* (2013.01); *H04L 67/20* (2013.01); *H04L 67/42* (2013.01)

(58) Field of Classification Search
USPC ........................................................ 709/219
See application file for complete search history.

(56) References Cited

U.S. PATENT DOCUMENTS

| | | | | |
|---|---|---|---|---|
| 9,279,693 | B2* | 3/2016 | Hymel | G01C 21/3461 |
| 9,279,694 | B1* | 3/2016 | Sheikh | G01C 21/3667 |
| 9,371,007 | B1* | 6/2016 | Penilla | G06Q 20/145 |
| 9,749,780 | B2* | 8/2017 | Huang | H04W 4/02 |
| 10,306,466 | B2* | 5/2019 | Denny | H04L 9/0861 |
| 10,318,992 | B2* | 6/2019 | Showers | G06Q 30/0239 |
| 10,375,437 | B2* | 8/2019 | Adderly | H04L 65/4084 |
| 10,423,998 | B2* | 9/2019 | Ming | G06Q 10/087 |
| 10,567,915 | B2* | 2/2020 | Subramanian | G06Q 30/06 |
| 10,636,207 | B1* | 4/2020 | Swidersky | G06T 15/20 |
| 2008/0126210 | A1 | 5/2008 | Shanahan | |
| 2010/0138037 | A1* | 6/2010 | Adelberg | G06Q 10/087 700/241 |
| 2011/0191180 | A1* | 8/2011 | Blackhurst | G06Q 30/0269 705/14.53 |
| 2011/0196724 | A1* | 8/2011 | Fenton | G06Q 50/01 705/14.16 |
| 2012/0249550 | A1* | 10/2012 | Akeley | H04N 21/25833 345/419 |
| 2013/0218449 | A1* | 8/2013 | Hymel | G01C 21/3461 701/408 |
| 2013/0318186 | A1 | 11/2013 | Leblanc | |
| 2013/0332284 | A1* | 12/2013 | Faith | G06Q 30/02 705/14.66 |
| 2013/0346204 | A1* | 12/2013 | Wissner-Gross | G06Q 30/0241 705/14.58 |
| 2014/0351010 | A1* | 11/2014 | Kong | G06Q 40/04 705/7.29 |
| 2015/0006319 | A1* | 1/2015 | Thomas | G06Q 30/0633 705/26.8 |
| 2015/0161715 | A1* | 6/2015 | Rose | G06Q 30/0639 705/26.8 |
| 2015/0262120 | A1* | 9/2015 | Kulig | G06Q 10/087 705/28 |
| 2016/0104189 | A1* | 4/2016 | Marcus | G06Q 30/0283 705/14.34 |
| 2016/0210682 | A1 | 7/2016 | Kannan | |
| 2016/0366551 | A1 | 12/2016 | Alsina | |
| 2017/0148079 | A1* | 5/2017 | Ponder | G06Q 30/0625 |
| 2019/0220890 | A1* | 7/2019 | Daigle | G06Q 30/0226 |
| 2019/0347711 | A1* | 11/2019 | Choo | H04W 4/025 |

* cited by examiner

SYSTEMS AND METHODS FOR EFFICIENT TRANSMISSION OF CATALOG DATA

TECHNICAL FIELD

This disclosure generally relates to updating mobile databases.

BACKGROUND

An enterprise computing system may allow content or information related to items sold by a physical location of an entity to be downloaded by a mobile or other computing device of a user while the user is physically present within the physical location. An application executed on the computing device of the user may be used to view information of items or purchase items carried at a particular physical location. This user experience is built on the assumption that the user will always have good network connectivity. However, depending on the construction material, internal structure, deployed networking equipment of the physical location, and the proximity of cellular network providers to the physical location, the computing device may have poor network access or connectivity at the physical location and may be unable to reliably download content at the physical location. As an example and not by way of limitation, a structure that is constructed using concrete and containing a number of large metal objects (e.g., freezers, refrigerators, or shelves) may disrupt connectivity of the computing device to any data network while the computing device is within the confines of the structure. This lack of connectivity needs to be overcome to maintain the user experience when the computing device may require access to the most recent information while within such a structure.

DESCRIPTION OF EXAMPLE EMBODIMENTS

Particular embodiments describe a method of automatically populating a mobile database with content associated with a physical location of an entity (e.g., a store) that is obtained from a server database of items. Herein, reference to a mobile database encompasses a database that is local to a mobile computing system and reference to a server database encompasses a database that resides on a server of an enterprise computing system. In particular embodiments, while the user is at one of the physical locations (e.g., store) of the entity, an application executed on a mobile computing system may allow users to view product information when browsing items carried in a physical store. This user experience assumes the user will have good network connectivity while inside the physical store. However, depending on the construction material, internal structure, deployed networking equipment of the physical location, and the proximity of cellular network providers to the physical location, the computing device may have poor network access or connectivity at the physical location and may be unable to reliably download content at the physical location. As an example and not by way of limitation, a structure that is constructed using concrete and containing a number of large metal objects (e.g., freezers, refrigerators, or shelves) may disrupt connectivity of the computing device to any data network while the computing device is within the confines of the structure. This lack of connectivity needs to be overcome to maintain the user experience when the computing device may require access to the most recent information while within such a structure.

As described below, a mobile database of the client system may be synchronized offline to the server database when the client system has reasonable network connectivity. In particular embodiments, an enterprise computing system may determine the state of the database of the client system when the client system is in proximity (e.g., within approximately 20 feet) to a physical location of a particular entity (e.g., a store location). The enterprise computing system then determines what content should be downloaded to update the database of the client device. In particular embodiments, the data to be provided to the database may be specific to the particular physical location of the entity (e.g., specific items carried by a specific store). The data may be transmitted in discrete sized blocks whose size is determined based on the bandwidth and reliability of connection between the client system and the data network. In particular embodiments, the download to the client device may prioritize transmission of content based on a ranking of the content (e.g., the rank may reflect a likelihood of the corresponding items being of interest to the user).

Figure 1:
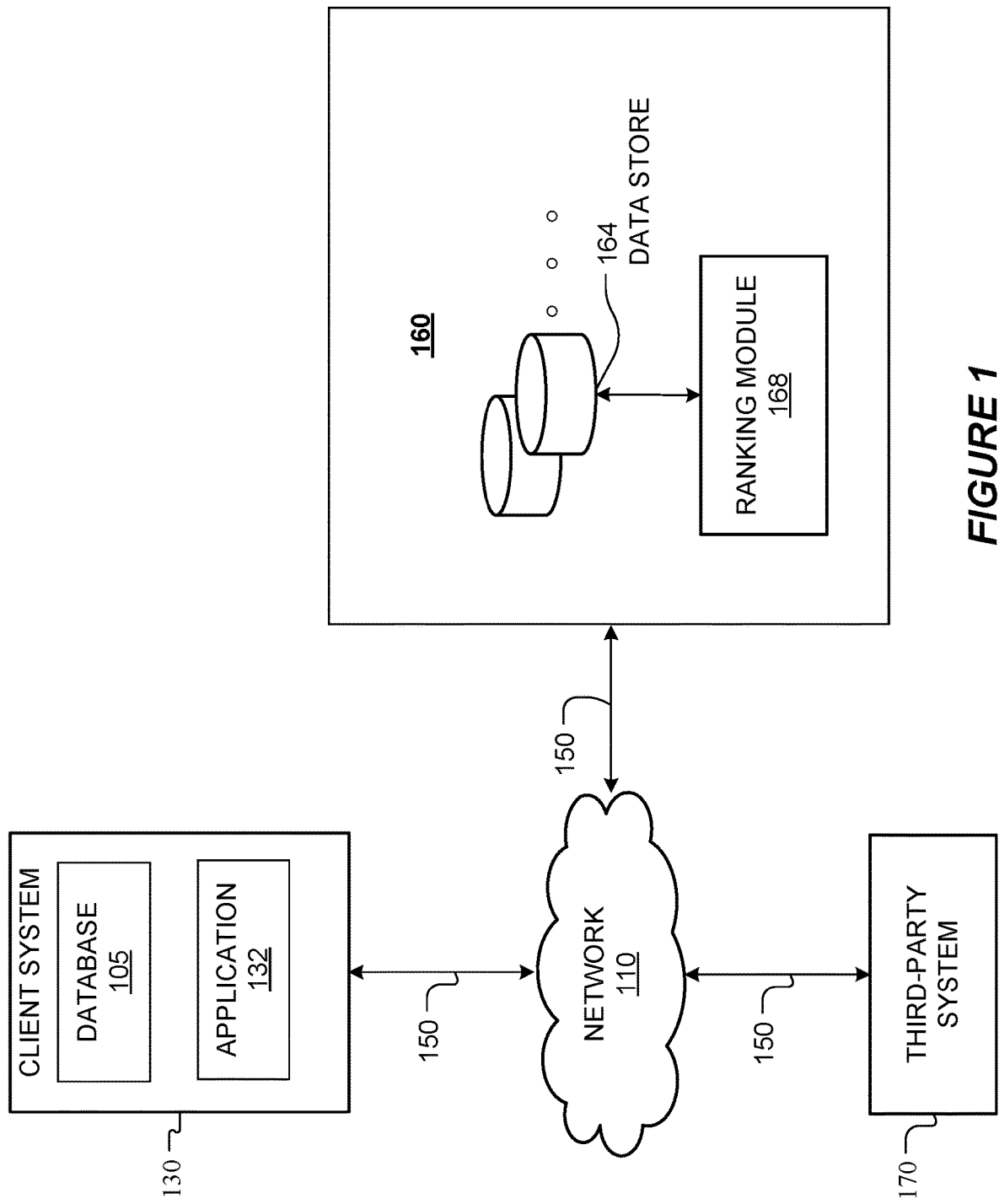
FIG. 1 illustrates an example network environment of an enterprise computing system.

FIG. 1 illustrates an example network environment associated with an enterprise computing system. Network environment 100 includes a client system 130, an enterprise computing system 160, and a third-party system 170 connected to each other by a network 110. Although FIG. 1 illustrates a particular arrangement of client system 130, enterprise computing system 160, third-party system 170, and network 110, this disclosure contemplates any suitable arrangement of client system 130, enterprise computing system 160, third-party system 170, and network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular data network, or a combination of two or more of these. Network 110 may include one or more networks 110.

Links 150 may connect client system 130, enterprise computing system 160, and third-party system 170 to network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), cellular (such as Global System for Mobile communications (GSM) or Code-division multiple access (CDMA)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150. For example, client system 130 may be connected to the enterprise computing system 160 and/or the third-party system 170 through a cellular data link, whereas enterprise computing system 160 and third-party system 170 may be connected through a fiber optic data link.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a notebook or laptop computer, netbook, a tablet computer, e-book reader, personal digital assistant (PDA), handheld electronic device, cellular telephone, smartphone, augmented/virtual reality device, other suitable electronic device, or any suitable combination thereof. This disclosure contemplates any suitable client systems 130. In particular embodiments, client system 130 may access network 110 and include one or more applications 132 and mobile database 105 executed locally on client system 130. A client system 130 may enable its user to communicate with other users at other client systems 130. In particular embodiments, in the case when link 150 corresponds to a cellular data network (e.g., 5G or long-term evolution (LTE)), some structures (e.g., a concrete building) may act to inhibit access of client system 130 to network 110. As an example and not by way of limitation, a store that is made of concrete and containing a number of large metal objects (e.g., freezers, refrigerators, or shelves) may disrupt the connectivity of client systems 130 to network 110 while client systems are within the confines of the physical location.

In particular embodiments, enterprise computing system 160 may be a network-addressable computing system. Enterprise computing system 160 may be accessed by the other components of network environment 100 either directly or via network 110. As an example and not by way of limitation, client system 130 may access enterprise computing system 160 using native application 132 associated with enterprise computing system 160 (e.g., a mobile computing application, a messaging application, another suitable application, or any combination thereof) via network 110. In particular embodiments, enterprise computing system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, enterprise computing system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, an enterprise computing system 160, or a third-party system 170 to manage, retrieve, modify, add, or delete, the information stored in data store 164.

As illustrated in the example of FIG. 1, enterprise-computing system 160 may include a ranking module 168 that is configured to prioritize location-specific content that is transmitted to client system 130 during a proximity phase, as described below. In particular embodiments, ranking module 168 may rank the location-specific content, as well as the likelihood that a particular item is to be purchased, which may be stored in data store 164, specifically for the user of client system 130. As an example and not by way of limitation, this ranking of location-specific content may determine a relative priority for transmitting the location-specific content, as described below. In particular embodiments, a list of items may be stored in data store 164. As an example and not by way of limitation, ranking module 168 may rank the items using a ranking model based on their inferred relevancy to a particular user or group of users. As an example and not by way of limitation, the ranking model may rank the items based on their inferred relevancy to a category of users (e.g., age groups or geographic location). In particular embodiments, the ranking model may rank items based on (1) information associated with the item (e.g., price, color, size, or features of the respective item) and (2) information associated with the users or categories of users (e.g., demographic information for the user, the user's location, or user profile information) or (3) historical information of interactions by a user or category of users with regard to the respective item (e.g., number of times an item was placed in a virtual cart, reading information of the item, reading reviews of the item, requesting information of the item, placing item on a wish list, or purchasing the item). As an example and not by way of limitation, ranking module 168 may access the history of purchases made by users in particular age groups or professions at each physical location of a particular entity to correlate items that are frequently purchased by users of particular demographics at a particular physical location. As another example, ranking module 168 may access the history of purchases at a particular physical location to correlate items that are purchased by users at a particular physical location to promotions or during particular times of day. As another example, ranking module 168 may access the virtual shopping of users on application 132 to identify items of interest to users based on the frequency items are scanned using application 132 at a particular physical location.

In particular embodiments, ranking module 168 may rank the location-specific content based on one or more factors. As an example and not by way of limitation, a factor may be based on a previous history of the user (e.g., previously purchased items) stored on a data store 164 of enterprise-computing system 160. As an example and not by way of limitation, a factor used by ranking module 168 may cause items previously purchased by the user to be ranked higher than items that have never been purchased by the user. In particular embodiments, another factor used by ranking module 168 may be a frequency in which particular items are purchased at a particular location as measured over a pre-determined amount of time. As an example and not by way of limitation, items that are frequently purchased at a particular location may be prioritized by ranking module 168 over items that are less frequently purchased. For example, if a particular user often purchases almonds at a particular store, information of almonds at the particular store may be transmitted to client system 130 before information about peanuts is transmitted to client system 130.

In particular embodiments, a location of the items (e.g., in front of the structure or in a middle aisle) within each particular location of the entity may be a factor used by ranking module 168 to prioritize the content transmitted to client system 130. As an example and not by way of limitation, based on the previous history of many users, items located on endcaps of the shelves or front of the physical location may have a higher interest (ranking by ranking module 168) than items that are physically located at the back of the physical location. In particular embodiments, ranking module 168 may rank items using a factor corresponding to the inventory level of the items at the particular location. As an example and not by way of limitation, ranking module 168 may rank items with low inventory levels (e.g., below a pre-determined threshold) lower than items with a high inventory level. In particular embodiments, the entity may promote particular items at all physical locations or at particular physical locations, and ranking module 168 may increase the ranking of these items accordingly. In particular embodiments, ranking module 168 may accord a higher ranking based on explicit input provided by the user (e.g., a list set up by the user). In particular embodiments, ranking module 168 may compute the ranking of items as a linear function with one or more weighting coefficients for each factor and bias coefficients. Ranking module 168 may independently adjust a weighting coefficient and bias coefficient of the linear function for each user or for groups of users. Although this disclosure describes and illustrates an enterprise computing system with particular components, this disclosure contemplates any suitable item-ranking system having any suitable components.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating enterprise computing system 160. In particular embodiments, however, enterprise computing system 160 and third-party systems 170 may operate in conjunction with each other to provide enterprise computing services to users of enterprise computing system 160 or third-party systems 170. In this sense, enterprise computing system 160 may provide a platform, or backbone, which other systems, such as third-party systems 170, may use to provide enterprise computing services and functionality to users across the Internet.

In particular embodiments, a third-party system 170 may include a third-party item provider. A third-party content object provider may include one or more sources of item information, which may be communicated to a client system 130. As an example and not by way of limitation, item information may include information regarding things or activities of interest to the user, such as, for example, product information and reviews, movie showtimes, movie reviews, restaurant reviews, restaurant menus, recipes, or other suitable information. As another example and not by way of limitation, content objects may include incentive content objects, such as coupons, gift certificates, promotional flyers, or other suitable incentive objects.

In particular embodiments, enterprise computing system 160 may include a variety of servers, sub-systems, programs, modules, logs, and data stores. In particular embodiments, enterprise computing system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Enterprise computing system 160 may also include suitable components such as network interfaces, security mechanisms, load balancers, failover servers, management-and-network-operations consoles, other suitable components, or any suitable combination thereof.

Figure 2:
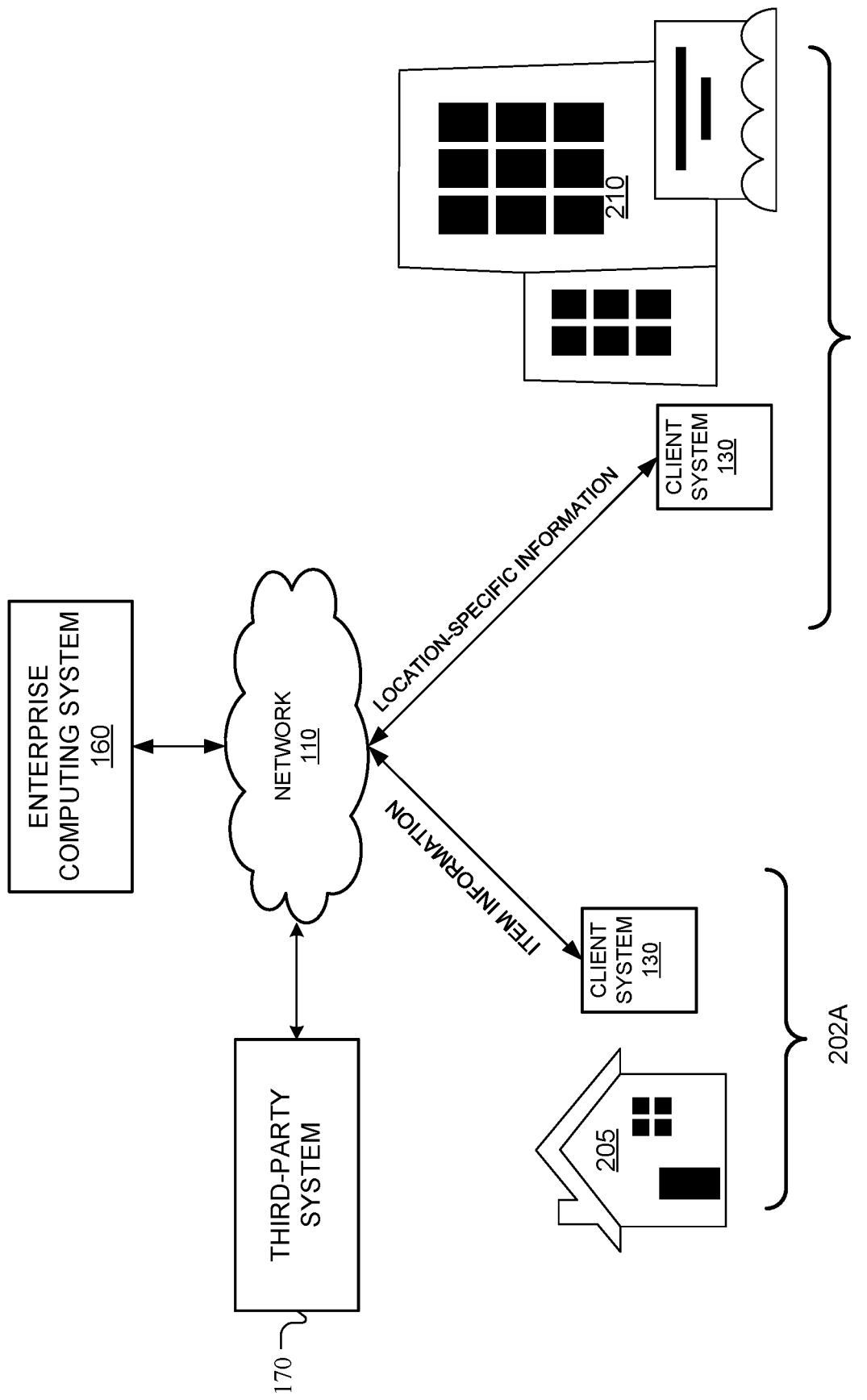
FIG. 2 illustrates an example updating of a mobile database on a client device.

FIG. 2 illustrates an example enterprise computing system. In particular embodiments, a mobile database of client system 130 is maintained and updated in two phases: a remote update phase 202 and a proximity phase 204. In the remote-update phase 202, the mobile database of client system 130 may be populated with information of items based on a commonality between items used by multiple entities (e.g., grocery store chains), which in particular embodiments may be determined based on the previous behavior of the user. As an example and not by way of limitation, an item may include a food product, album, book, movie, television show, or any other content. In particular embodiments, information of a set of items (e.g., 30,000 items) that are common to a number of physical locations 205 (e.g., stores) visited by the user may be downloaded onto client system 130 and used to populate the mobile database. In particular embodiments, enterprise-computing system 160 may access one or more third-party systems 170 for the item information and store the item information in data store 164. For example, the item information retrieved from third-party system 170 may include stock keeping unit (SKU) information used for inventory tracking or metadata (e.g., title, picture, or description) associated with the item. In particular embodiments, remote-update phase 202 is performed when client system 130 has reasonable connectivity to network 110. As an example and not by way of limitation, remote-update phase 202 may be initiated in response to determining client system 130 is connected network 110 through link 150 having at least a pre-determined bandwidth (e.g., approximately 10 Mbps). In particular embodiments, the information of the items may be transmitted to client system 130 as a compressed file. As illustrated in the example of FIG. 2, in remote-update phase 202, the transmission of item information may be initiated when client system 130 is in an area with reasonable connectivity (e.g., bandwidth above a threshold level), such as for example proximity to a residence 210 with a WI-FI network. As another example, the item information may be transmitted to client system 130 while the user is driving to physical location 205 and client system 130 is connected to a cellular data network.

As an example and not by way of limitation, when client system 130 is being used to browse items at a physical store 205, the native application of client system 130 displaying information of the items should be up to date. For the location-specific information to be up to date, the location-specific information should be downloaded while client system 130 is in the physical location 205 or just prior to entering physical location 205. As described above, location-specific information of particular location 205 may be separately downloaded in proximity phase 204. As an example and not by way of limitation, based on GPS location data of client system 130, enterprise-computing system 160 may transmit the location-specific content (e.g., pricing, physical layout, inventory, or promotions) when client system 130 is in proximity to physical location 205 of the entity or is likely the user will enter physical location 205. In particular embodiments, determining client system 130 is likely to enter physical location 205 may be based on location or GPS data from the client device or receiving, from client system 130, a request for the location-specific item information.

As illustrated in the example of FIG. 2, in proximity phase 204, when the user is driving/walking to physical location 205 or in a parking lot, client system 130 may determine the state of the mobile database of client system 130 when the user is in proximity to (e.g., approximately 20 feet) or is likely to enter physical location 205 (e.g., a store location). In particular embodiments, the triggering threshold proximity may be increased if, based on the historical location data of the user, the user typically enters a particular store 205 when the user is in the neighborhood. In particular embodiments, if a user rarely enters a particular physical store 205, then the triggering threshold proximity may be smaller since more evidence may be needed to deem it likely that the user will visit physical location 205. As an example and not by way of limitation, if there are two grocery stores (e.g., Whole Foods) in a geographic region, the particular grocery store that the user frequently visits may have a larger triggering threshold proximity than the triggering threshold proximity for the other grocery store that the user rarely visits. In particular embodiments, the triggering threshold proximity may be based on the historical behavior of the user. As an example and not by way of limitation, a particular user may perform their grocery shopping every Sunday night. As another example, the triggering threshold proximity may be based on the expiration dates of known previously purchased items. For example, it is more likely that the user will go to a physical location 205 when one or more previously purchased items are about to expire. As another example, the triggering threshold proximity may be based on a supply of particular items. For example, it is more likely that the user will go to a physical location 205 when a supply of medication is about to run out.

Enterprise computing system 160 may then determine the location-specific content to be downloaded to update the database of the client device. In particular embodiments, the content or data to be provided to update the mobile database of the client device may be the data of the items that is specific to the particular location of the entity (e.g., a specific store) that is likely to be visited by the client system 130 (e.g., the likelihood of visit may be based on the entity's proximity to the current or predicted location of client system 130). In particular embodiments, the content to be downloaded to client system 130 may be prioritized based on a ranking of the content by ranking module 168 of enterprise computing system 160, as described above. When client system 130 is in proximity to physical location 205 of the entity or is likely the user will enter the physical location, location-specific information for a pre-determined number of items, identified during remote-update phase 202, may be transmitted to the mobile database of client system 130. As described above, the location-specific information may vary between entities or between different physical locations 205 for the same entity. As an example and not by way of limitation, the location-specific information for a particular physical location 205 may include information of additional store-specific items, inventory, prices of the item, promotions (e.g., on sale or special) associated with the item, or information of the location of the items within physical location 205 (e.g., near an aisle or back of the building).

In proximity phase 204, the location-specific information is a large amount of data that has to be transmitted to client system 130 in a limited time before the user enters the area of low connectivity (e.g., physical location 205). For this reason, enterprise computing system 160 may prioritize the transmission of the location-specific content, based on the ranking by ranking module 168, to provide the most useful information before connectivity to client system 130 is interrupted.

As described above, the location-specific information of higher-ranked items, as determined by ranking module 168, may be transmitted to client system 130 before location-specific information of lower-ranked items. In particular embodiments, the location-specific information may be transmitted in discrete blocks of a pre-determined size. The pre-determined size of the discrete blocks of location-specific content may be determined based on the bandwidth or reliability of connection or link 150 between client system 130 and network 110. In particular embodiments, the received location-specific information is incorporated into the mobile database of client system 130. In particular embodiments, enterprise computing system 160 may determine that the database of client system 130 is incomplete, and, at 308, enterprise computing system 160 may transmit the remaining location-specific content, as well as any recent updates (e.g., price changes) to client system 130 once connectivity to enterprise computing system 160 is reestablished.

Figure 3:
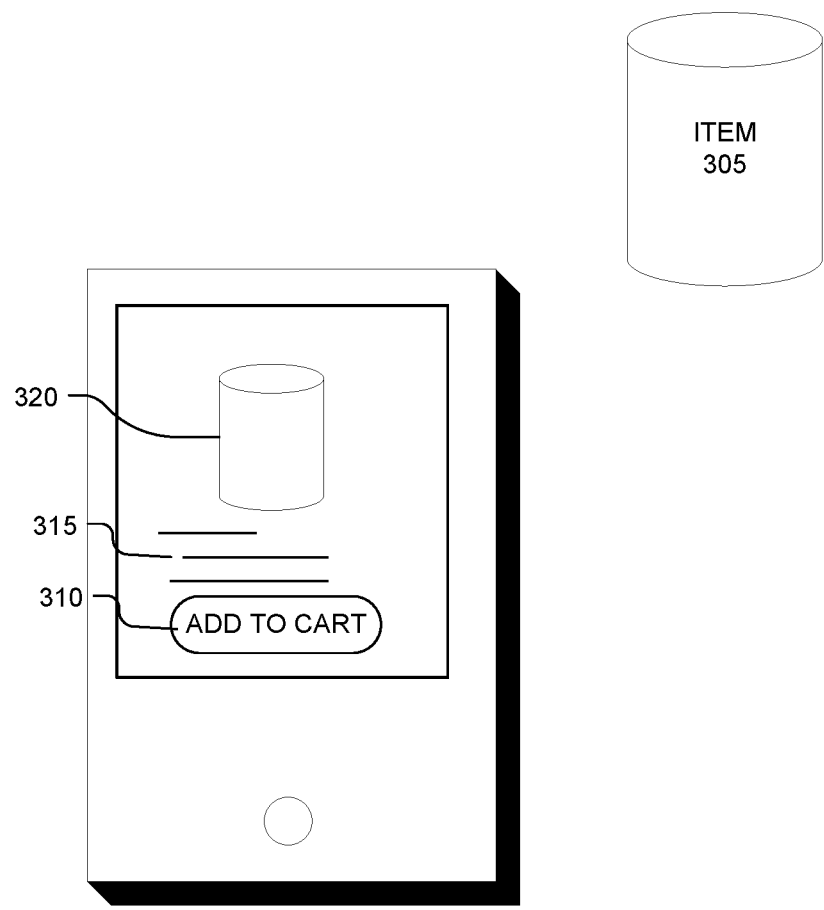
FIG. 3 illustrates an example wireframe of a GUI of the client system at a particular location.

FIG. 3 illustrates an example wireframe of a GUI of the client system at a particular location. In particular embodiments, client system 130 may not require a data connection until a payment is made because content or item information sufficient for the primary shopping experience may have been downloaded in the remote update phase and the proximity phase, described above. In particular embodiments, the application executed on client system 130 may provide a catalog of items that can be found at the physical location that is generated based on specified items available to the user at a physical location. For example, the catalog may have one or more featured items and a pre-determined number of items (e.g., an item previously purchased or special promotion) that are determined to be of potential interest to the user based on previous behavior or user history. In the context of a physical location, while scanning an item 320 for purchase (e.g., through a barcode or QR code), client system 130 may access item information (e.g., product information) and location-specific information (e.g., pricing or quantity information) of the scanned item 320. In particular embodiments, the catalog may be regenerated or updated for item changes (e.g., no longer available, new packaging, or price changes) based on the received location-specific content, described above. After client system 130 has downloaded the location-specific information of a particular item, when scanning the UPC of an item, the GUI of the application may display an image associated with the item 305, one or more call-to-action (CTA) buttons 310 (e.g., put item in a virtual shopping cart) and other information 315 such as for example, item description, pricing, quantity, or vendor information, as illustrated in FIG. 3. In particular embodiments, if a scanned item has incomplete information (e.g., due to incomplete item data download during the proximity phase), an application associated may display an image 320 of the item 305, the call-to-action (CTA) button 310, and other information 315, where other information 315 does not include the location-specific information that was not downloaded in the proximity phase. In particular embodiments, in the case where scanned item 320 has an unrecognized UPC due to the item information not being downloaded (e.g., interrupted remote update phase or a brand-new item), the GUI of the application may provide an error message indicating that the information of the scanned item 320 (e.g., item information and location-specific information) needs to be downloaded.

Figure 4:
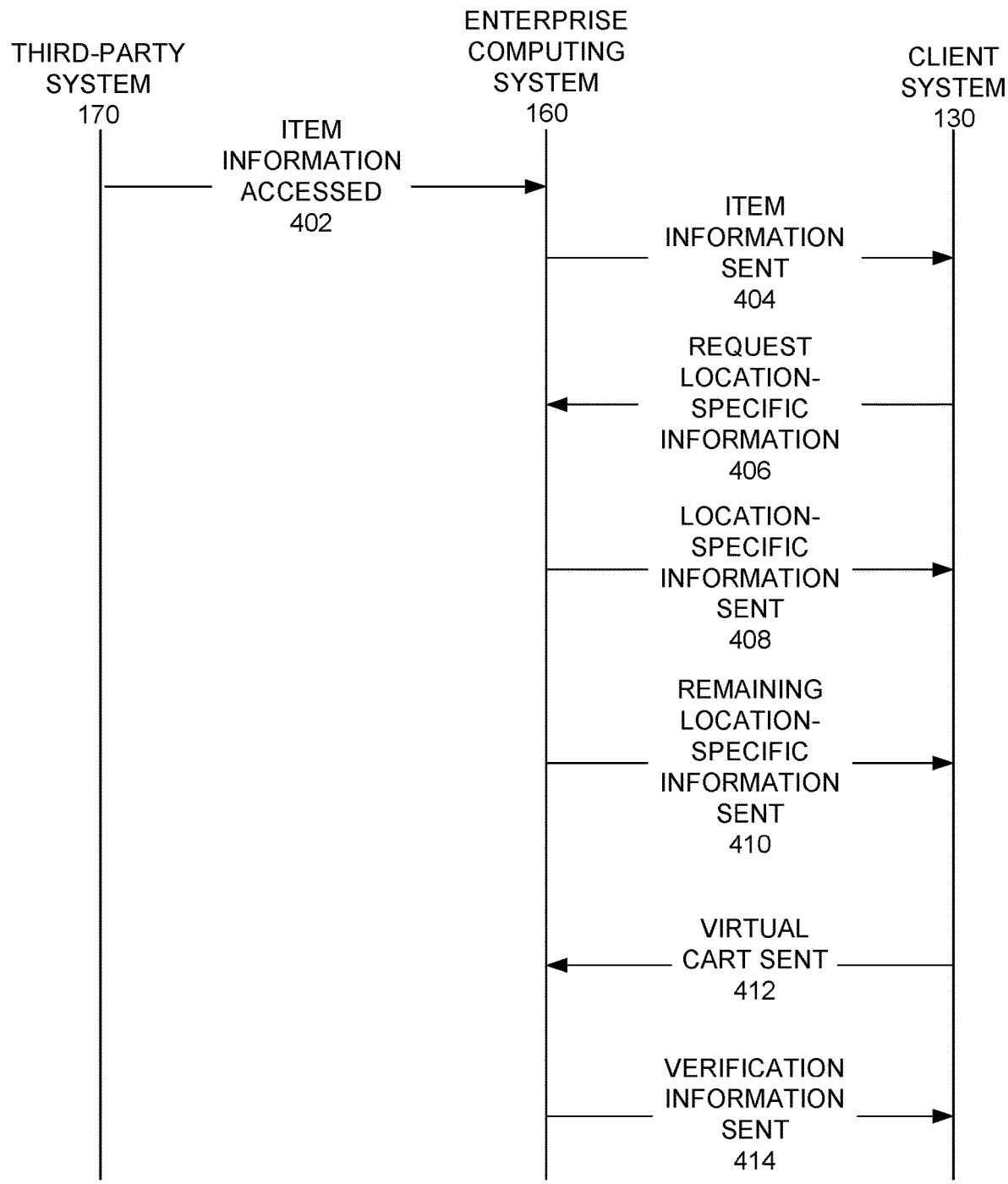
FIG. 4 illustrates an example interaction diagram between an enterprise system and a client system for updating a mobile database on a client device.

FIG. 4 illustrates an example interaction diagram between an enterprise system and a client system for updating a mobile database of the client system. As illustrated in the example of FIG. 4, data or content is exchanged between enterprise computing system 160, third-party system 170 and client system 130. Although FIG. 4 illustrates a single third-party system 170 and client system 130 for simplicity, embodiments of the system may include multiples of any of the components, such as additional third-party systems and multiple client systems. As described above, in the remote-update phase, enterprise-computing system 160 may determine a set of items (e.g., brands of bread or milk) that are common to multiple entities (e.g., stores). In particular embodiments, enterprise-computing system 160 may optionally access, at 402, item information of the set of items from third-party system 170. Alternatively, such item information may be generated and stored by the enterprise itself without the involvement of a third party. In particular embodiments, enterprise computing system 160 may process the item information and, at 404, transmit the item information to client system 130 when client system 130 has connectivity above a pre-determined threshold (e.g., bandwidth). Enterprise computing system 160 may push the data to client system 130 or client system 130 may request the data from enterprise computing system 160 via a pulling mechanism.

In particular embodiments, at 406, in the proximity phase, client system 130 may transmit GPS location data to enterprise computing system 160, when enterprise computing system 160 determines when to send location-specific information. In particular embodiments, at 406, client system 130 may transmit a request for location-specific information for a particular physical location, when client system 130 makes determines proximity or likelihood of entering the physical location. Enterprise computing system 160 may determine the state of the database stored on client system 130 when client system 130 is in proximity to a physical location (e.g., a store location). Enterprise computing system 160 may transmit, at 408, location-specific information to client system 130. In the context of a physical location, while client device 130 scans items (e.g., through a barcode or quick-response (QR) code), client system 130 may access the item information and location-specific information of the scanned item stored in the mobile database. In particular embodiments, client system 130 may not require a data connection until a payment is made because item information sufficient for the primary experience may have been downloaded in the remote update phase and the proximity phase at 402 and 404, respectively. The application executed on client system 130 may determine if the mobile database of client system 130 is incomplete, thereby indicating that the location-specific information of the scanned item may have not yet been received. As an example and not by way of limitation, if the scanned item lacks location-specific due to an incomplete data download during proximity phase 404 or the scanned item having too low priority to be transmitted earlier (e.g., low ranking), the application may provide the item information (e.g., image or item description) without the location-specific information, but the scanned item may still be selected without the location-specific information.

In particular embodiments, enterprise computing system 160 may determine that the mobile database of client system 130 is incomplete, and, at 410, enterprise computing system 160 may transmit the remaining location-specific content, as well as any recent updates (e.g., price or availability changes) to client system 130 once connectivity to enterprise computing system 160 is reestablished. In particular embodiments, the items that have been scanned may be added to a virtual cart of the application, where the user may review the selected or scanned items in the virtual cart. At 412, the items in the virtual shopping cart are queued in client system 130 for a final price check and the information indicating which items are in the virtual cart is transmitted to enterprise computing system 160. At 414, enterprise computing system 160 may send verification information to client system 130 indicating a transaction involving the scanned items has been completed. In particular embodiments, the verification information may initiate a process where the application generates a QR code or bar code (e.g., PDF 417) that encodes information of the items in the virtual cart (e.g., image, item description, or quantity) and the QR code may be scanned to link the purchases to the user of client system 130. In particular embodiments, the entity may use the verification information to verify the items scanned by the user. As an example and not by way of limitation, the QR code may be scanned by an employee at the physical location, and an enterprise scanning system may retrieve a list of items of the virtual cart from the enterprise system 160. The employee at the physical location may use the information encoded in the QR code to verify the purchase by performing a visual verification of the items carried by the user of client system 130. In particular embodiments, enterprise computing system 160 may access data of the user from a social-networking system to generate a user profile. As an example and not by way of limitation, as an added security feature, enterprise computing system 160 may include a profile image with the verification information when the employee is verifying the purchase.

Figure 5:
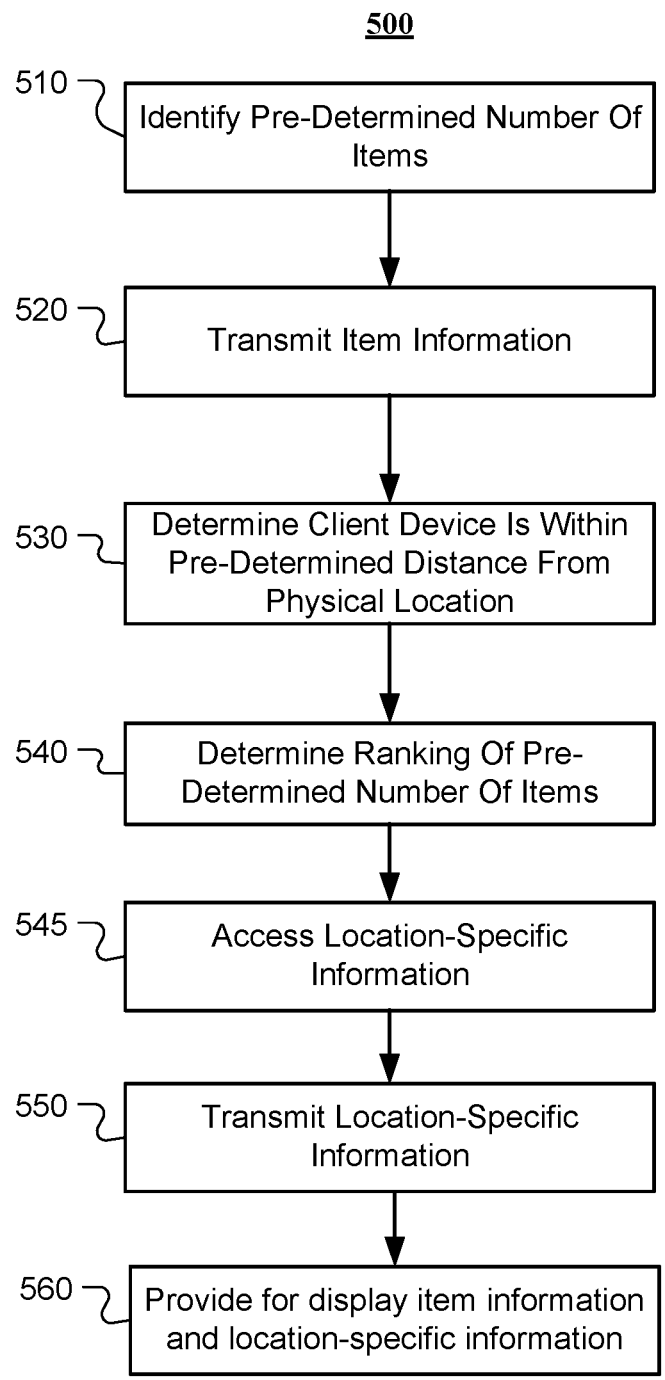
FIG. 5 illustrates an example method for updating a database on a client device to avoid potential issues with network connectivity.

FIG. 5 illustrates an example method for updating a database. The method 500 may begin at step 510, where a computing device may identify a pre-determined number of items of one or more entities. In particular embodiments, the items correspond to items carried by a physical location of the entity (e.g., a store). At step 520, the computing device may transmit item information associated with the pre-determined number of items to a client device. In particular embodiments, the item information may be transmitted when the connectivity of the client device is above a pre-determined bandwidth or reliability. In particular embodiments, the item information may include SKU information used for inventory tracking or metadata (e.g., title, picture, UPC information, or description) associated with the item. In particular embodiments, this determination may be based on GPS location data of the client device. At step 530, the computing device may determine the client device is within a pre-determined distance from a physical location of the one or more entities. In particular embodiments, this determination may be based on GPS location data of the client device. At step 540, the computing device may determine a ranking of the pre-determined number of items based historical data of the user in response to the determination. In particular embodiments, the historical data of the user may include a number of times an item was placed in a virtual cart, number of times information of the item (e.g., a description) were read, number of times reviews of the item were read, requesting information of the item, placing item on a wish list, or purchasing the item. As an example and not by way of limitation, a ranking module may rank items previously purchased by the user higher than items that have never been purchased by the user.

At step 545, the computing device may access, based on the entity, location-specific item information associated with the pre-determined number of items or additional items. In particular embodiments, the computing device may access a third-party system of the entity to obtain the location-specific information. At step 550, the computing device may transmit location-specific information associated with the pre-determined number of items in an order based on the ranking. As an example and not by way of limitation, location-specific information may include the price of the item, promotions (e.g., on sale or special) associated with the item, or information of the physical location of the items in the store. At step 560, the computing device may provide for display on the client device, item information and location-specific information of a particular item in response to a selection of the particular item. As an example and not by way of limitation, the client device may display a picture, description, and price of a selected item. In addition, the client device may display a call to action button for the user to select the displayed item.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for updating a mobile database including the particular steps of the method of FIG. 5, this disclosure contemplates any suitable method for updating a mobile database including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
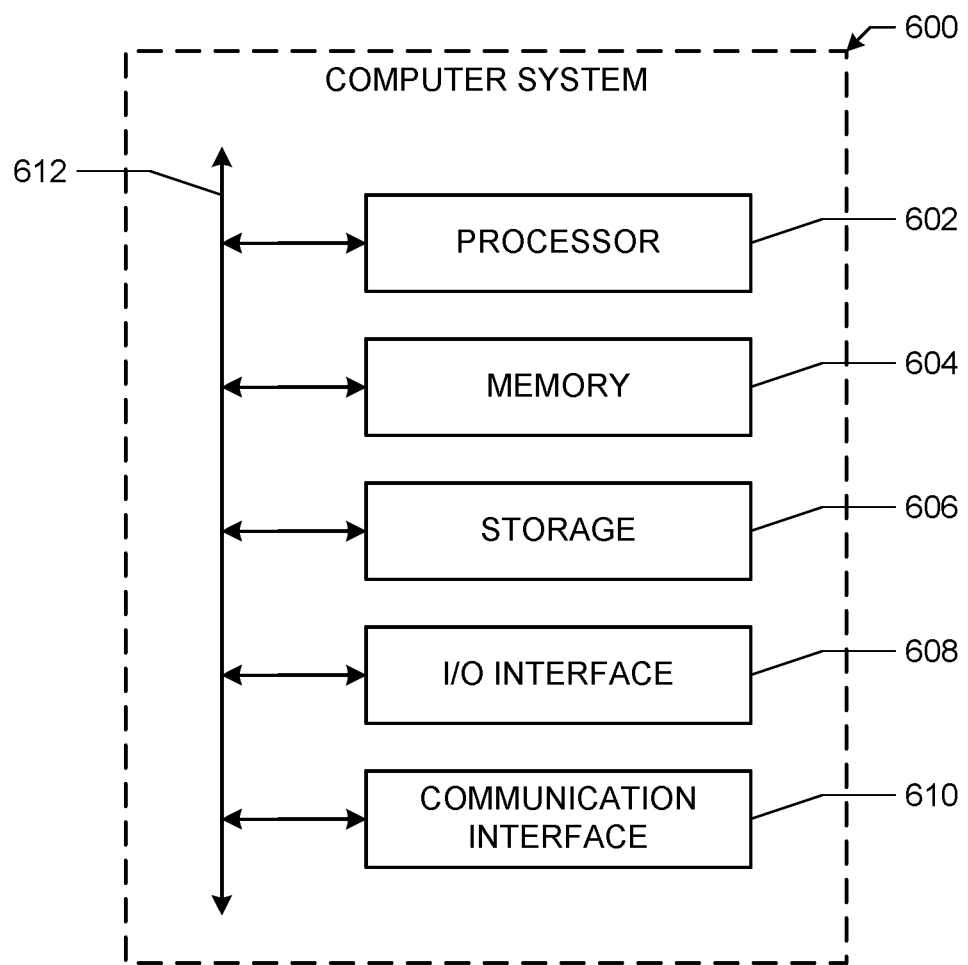
FIG. 6 illustrates an example computer system.

FIG. 6 illustrates an example computer system. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnects.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, identifying a plurality of in-store items that are commonly offered for sale by a plurality of entities, the plurality of in-store items comprising a first in-store item;
   by the computing device, transmitting a first content package comprising common in-store item information about the first in-store item to a client device, the common in-store item information being common to the plurality of entities and comprises a description of the first in-store item;
   by the computing device, after transmitting the common in-store item information, determining that the client device is likely to enter a first entity of the plurality of entities, wherein the first entity is identified based on a physical proximity between the client device and the first entity;
   by the computing device, after determining that the client device is likely to enter the first entity:
   accessing, based on the first entity, a second content package comprising location-specific in-store item information about the first in-store item, the location-specific in-store item information being specific to the first entity and comprises a price of the first in-store item; and
   transmitting, prior to the client device entering the first entity, the second content package to the client device separate from the first content package, wherein the common in-store item information and the location-specific in-store item information are configured to be used by an in-store shopping application on the client device to generate complete information about the first in-store item for a catalog of in-store items offered for sale by the first entity while the client device is within the first entity.

2. The method of claim 1, wherein transmitting the second content package comprises determining a download size of the location-specific in-store item information based on a bandwidth and reliability of a data connection between the computing device and the client device prior to the client device entering the first entity.

3. The method of claim 1, further comprising determining a ranking of the plurality of in-store items based on historical purchase patterns of a user associated with the client device, wherein common in-store item information associated with the plurality of in-store items are transmitted to the client device according to the ranking.

4. The method of claim 1, further comprising:
   causing the common in-store item information and the location-specific in-store item information to be incorporated into a mobile database on the client device, wherein the mobile database is used by the client device to generate the catalog.

5. The method of claim 1, further comprising:
   determining a current state of a mobile database on the client device; and
   determining one or more updates to change the current state of the mobile database to an end state of the mobile database indicated by the computing device, wherein the determined one or more updates are used to determine the location-specific in-store item information to transmit to the client device.

6. The method of claim 1, further comprising:
   accessing a listing of entities previously visited by a user of the client device, the listing of entities being a subset of the plurality of entities and includes the first entity; wherein the listing of entities is used to determine that the client device is likely to enter the first entity.

7. The method of claim 1, wherein determining the client device is likely to enter the first entity is based on an indication from the client device indicating that a user of the client device selected the first entity.

8. The method of claim 1, wherein the catalog is configured to provide information about a particular in-store item of the plurality of in-store items selected by a user of the client device while the user is shopping within the first entity.

9. The method of claim 1, wherein the location-specific instore item information further comprises a promotion or a saleable quantity associated with the one or more in-store items offered by the first entity.

10. The method of claim 1, further comprising:
    receiving, from the client device while the client device is within the first entity, a purchase request for a selected one of the plurality of in-store items offered by the first entity, wherein the selected one of the plurality of in-store items is selected using the in-store shopping application and the purchase request is generated by the in-store shopping application.

11. The method of claim 1, wherein the transmission of the second content package to the client device is further based on a determination that wireless connectivity within the first entity is below a threshold.

12. One or more computer-readable non-transitory storage media embodying software that is operable, when executed, to:
  identify a plurality of in-store items that are commonly offered for sale by a plurality of entities, the plurality of in-store items comprising a first in-store item;
  transmit a first content package comprising common in-store item information about the first in-store item to a client device, the common in-store item information being common to the plurality of entities and comprises a description of the first in-store item;
  after transmitting the common in-store item information, determine that the client device is likely to enter a first entity of the plurality of entities, wherein the first entity is identified based on a physical proximity between the client device and the first entity;
  after determining that the client device is likely to enter the first entity:
    access, based on the first entity, a second content package comprising location-specific in-store item information about the first in-store item, the location-specific in-store item information being specific to the first entity and comprises a price of the first in-store item; and
    transmit, prior to the client device entering the first entity, the second content package to the client device separate from the first content package, wherein the common in-store item information and the location-specific in-store item information are configured to be used by an in-store shopping application on the client device to generate complete information about the first in-store item for a catalog of in-store items offered for sale by the first entity while the client device is within the first entity.

13. The media of claim 12, wherein the software is further operable, when executed, to determine a download size of the location-specific in-store item information based on a bandwidth and reliability of a data connection between the computing device and the client device prior to the client device entering the first entity.

14. The media of claim 12, wherein the software is further operable, when executed, to determine a ranking of the plurality of in-store items based on historical purchase patterns of a user associated with the client device, wherein common in-store item information associated with the plurality of in-store items are transmitted to the client device according to the ranking.

15. The media of claim 12, wherein the transmission of the second content package to the client device is further based on a determination that wireless connectivity within the first entity is below a threshold.

16. The media of claim 12, wherein the software is further operable, when executed, to access a listing of entities previously visited by a user of the client device, the listing of entities being a subset of the plurality of entities and includes the first entity;
  wherein the listing of entities is used to determine that the client device is likely to enter the first entity.

17. A system comprising:
one or more processors; and
a memory coupled to the processors comprising instructions executable by the processors, the processors being operable when executing the instructions to:
  identify a plurality of in-store items that are commonly offered for sale by a plurality of entities, the plurality of in-store items comprising a first in-store item;
  transmit a first content package comprising common in-store item information about the first in-store item to a client device, the common in-store item information being common to the plurality of entities and comprises a description of the first in-store item;
  after transmitting the common in-store item information, determine that the client device is likely to enter a first entity of the plurality of entities, wherein the first entity is identified based on a physical proximity between the client device and the first entity;
  after determining that the client device is likely to enter the first entity:
    access, based on the first entity, a second content package comprising location-specific in-store item information about the first in-store item, the location-specific in-store item information being specific to the first entity and comprises a price of the first in-store item; and
    transmit, prior to the client device entering the first entity, the second content package to the client device separate from the first content package, wherein the common in-store item information and the location-specific in-store item information are configured to be used by an in-store shopping application on the client device to generate complete information about the first in-store item for a catalog of in-store items offered for sale by the first entity while the client device is within the first entity.

18. The system of claim 17, wherein the processors are further operable to determine a download size of the location-specific in-store item information based on a bandwidth and reliability of a data connection between the computing device and the client device prior to the client device entering the first entity.

19. The system of claim 17, wherein the processors are further operable to determine a ranking of the plurality of in-store items based on historical purchase patterns of a user associated with the client device, wherein common in-store item information associated with the plurality of in-store items are transmitted to the client device according to the ranking.

20. The system of claim 17, wherein the transmission of the second content package to the client device is further based on a determination that wireless connectivity within the first entity is below a threshold.

* * * * *